(12) United States Patent
Le

(10) Patent No.: US 8,203,542 B2
(45) Date of Patent: Jun. 19, 2012

(54) POINTING DEVICE

(75) Inventor: Jye-Ming Le, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 1330 days.

(21) Appl. No.: 11/892,902

(22) Filed: Aug. 28, 2007

(65) Prior Publication Data

US 2008/0047763 A1    Feb. 28, 2008

(30) Foreign Application Priority Data

Aug. 28, 2006  (TW) ............................... 95131573 A

(51) Int. Cl.
  *G06F 3/043* (2006.01)
(52) U.S. Cl. ........................................ 345/177
(58) Field of Classification Search .................. 345/177
  See application file for complete search history.

(56) References Cited

U.S. PATENT DOCUMENTS

| | | | | |
|---|---|---|---|---|
| 5,986,224 A | * | 11/1999 | Kent | 178/18.04 |
| 8,077,163 B2 | * | 12/2011 | Qi | 345/177 |
| 2003/0080947 A1 | * | 5/2003 | Genest et al. | 345/173 |
| 2005/0243071 A1 | * | 11/2005 | Kent et al. | 345/177 |
| 2008/0042998 A1 | * | 2/2008 | Orsley | 345/177 |

* cited by examiner

*Primary Examiner* — Ke Xiao
(74) *Attorney, Agent, or Firm* — Winston Hsu; Scott Margo

(57) ABSTRACT

The invention relates to a pointing device including a touch plane for an object moving thereon to generate a sound, a microphone for converting the sound into a sound wave signal, and a control unit. The control unit receives the sound wave signal and determines a moving direction of the object, so as to generate a direction signal. Accordingly, the moving direction of the object can be determined according to the sound wave signal received by the microphone, such that the volume and the cost of the pointing device of the invention can be reduced.

12 Claims, 4 Drawing Sheets

POINTING DEVICE

BACKGROUND OF THE INVENTION

1. Field of the Invention

The invention relates to a pointing device, and more particularly, it relates to a pointing device cooperating with a microphone to determine a moving direction of an object.

2. Description of the Prior Art

Because a graphical user interface (GUI) is an important part of all the operation systems (OS), a pointing device (e.g. mouse) for controlling a cursor has also become an essential equipment of an electronic device.

The most common pointing device is a mouse electronically connecting to an electronic device with a wired or wireless connection. The mouse utilizes a trackball or an infrared radiation to detect the movement itself. The mouse outputs a direction signal to the electronic device, such that the electronic device can control the cursor on the screen to move according to the direction signal. When the control button of the mouse is pressed, the mouse can also output an executing instruction to the electronic device.

The mouse is an independent device, so it is not suitable for a portable electronic device. Therefore, in the respect of controlling the cursor, most notebooks utilize touch pads, and most game consoles utilize multi-direction keys instead of the mouse. In order to satisfy different kinds of requirements, companies have been developing many kinds of pointing devices.

The main function of a microphone is to receive a sound which means to convert the sound into a sound wave signal. Many techniques are provided to solve some sound-receiving problems, such as sound feedback, wind shear, noise, gain, and problems of the like, such that the techniques in microphones are considered mature. Currently, a microphone is an essential component of a communication device, and it converts sounds into different sound wave signals. Therefore, communication devices can process data converted from sound wave signals. For example, communication devices transmit the sounds of a caller to the receiver.

SUMMARY OF THE INVENTION

The invention utilizes different sound waves to represent different directions (e.g. up, down, left or right) and different inputs. The sound wave is received by a microphone and then analyzed by a control unit to generate a corresponding direction signal or a control signal.

A scope of the invention is to provide a smaller pointing device.

A scope of the invention is to provide a cheaper pointing device.

A scope of the invention is to provide a pointing device for inputting a direction or a control signal according to sound waves.

The invention provides a pointing device comprising a touch plane, a microphone, and a control unit. The touch plane is used for allowing an object moving thereon to generate a sound. The microphone is used for converting the sound into a sound wave signal. When the control unit receives the sound wave signal, the control unit analyzes the sound wave signal to determine the moving direction of the object on the touch plane, so as to correspondingly generate a direction signal. By receiving the sound with the microphone, users can move the object on the touch plane to correspondingly control the movement of the cursor on the screen.

The microphone can be a matrix-type microphone. The control unit analyzes the sound wave signal sequentially generated from which two of the regions and then determines a moving direction of the object to generate a corresponding direction signal.

The touch plane of the pointing device can also be divided into multiple regions. When the object moves on a different region, a different sound wave signal is generated. The control unit is capable of determining where the object is moving according to the sound wave signal. Therefore, the cost of the pointing device of the invention can be even lower.

In order to generate a different sound, each region of the touch plane respectively can have a different notch or material. Besides, the different notch or material can provide a different touch to the user.

The control unit of the pointing device further stores characteristic data of the sound corresponding to a press action. When the control unit receives the sound wave signal matching the aforesaid characteristic data, the control unit determines the way the object is being pressed, so as to generate a control signal.

BRIEF DESCRIPTION OF THE APPENDED DRAWINGS

DETAILED DESCRIPTION OF THE INVENTION

The advantage and spirit of the invention may be understood by the following recitations together with the appended drawings.

Figure 1:
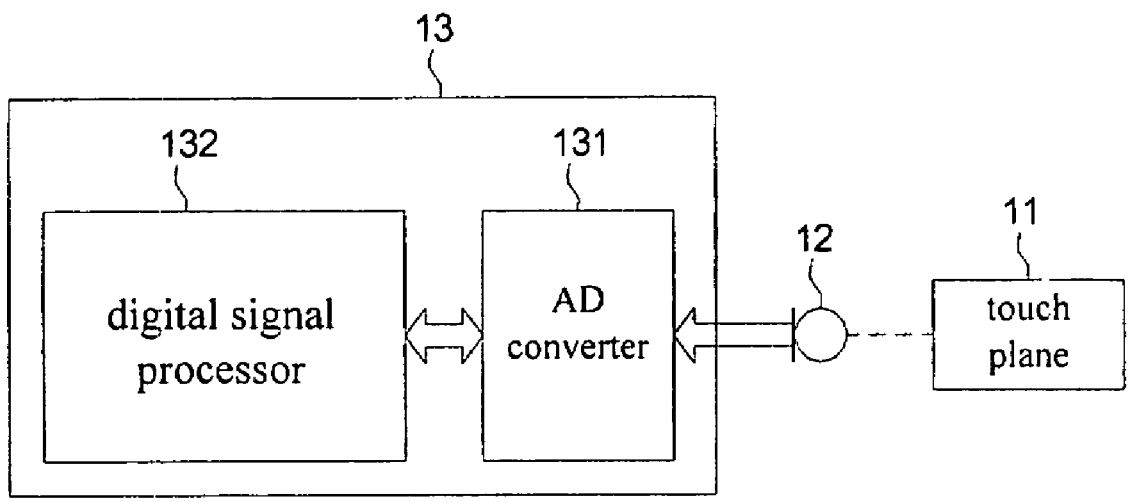
FIG. 1 is a block diagram of a pointing device according a preferred embodiment of the invention.

Please refer to FIG. 1. FIG. 1 is a block diagram of a pointing device according a preferred embodiment of the invention. In this embodiment, the pointing device comprises a touch plane 11, a microphone 12, and a control unit 13. The pointing device of the invention is configured in, for example, a cell phone, a notebook, a personal digital assistant (PDA), and similar electronic devices. In this embodiment, the pointing device is configured in a cell phone as an example. Therefore, in the following embodiments, the electronic device means the cell phone. The pointing device can also be an independent device and is not limited by the disclosed embodiments.

The touch plane 11 is used for an object, such as a finger, moving thereon to generate a sound. The microphone 12 converts the sound into a sound wave signal. The control unit 13 has an analog to digital converter (AD converter) 131 and a digital signal processor 132. The AD converter 131 receives and digitalizes the sound wave signal, and then transmits a digitalized sound wave signal to the digital signal processor 132. According to the digitalized sound wave signal, the digital signal processor 132 determines the action of the object on the touch plane 11 and then generates a corresponding signal to the cell phone.

Figure 2:
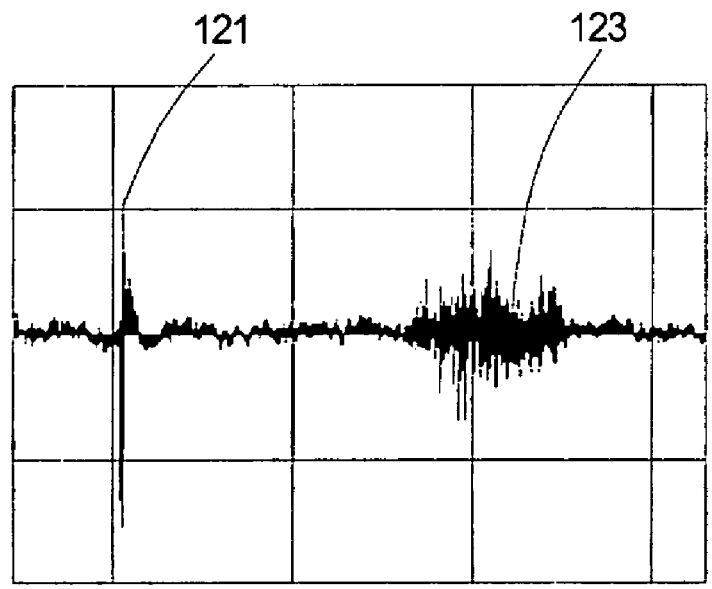
FIG. 2 is a wave diagram of a sound generated by an object pressing the touch plane.

Please refer to FIG. 1 and FIG. 2. FIG. 2 is a wave diagram of a sound generated by an object pressing the touch plane 11. That a user utilizes the object to press the touch plane 11 can be divided into three steps: the object pressing down, the object staying thereon, and the object being raised. When the object presses down, the microphone 12 correspondingly generates a pulse 121. When the object stays still, there is no sound. When the object is raised, a continuous wave 123 is generated. Accordingly, the digital signal processor 132 only needs to store the characteristic data corresponding to the action of the object pressing on the touch plane 11. When the digitalized sound wave signal is received, whether the object presses the touch plane 11 can be determined.

Figure 3:
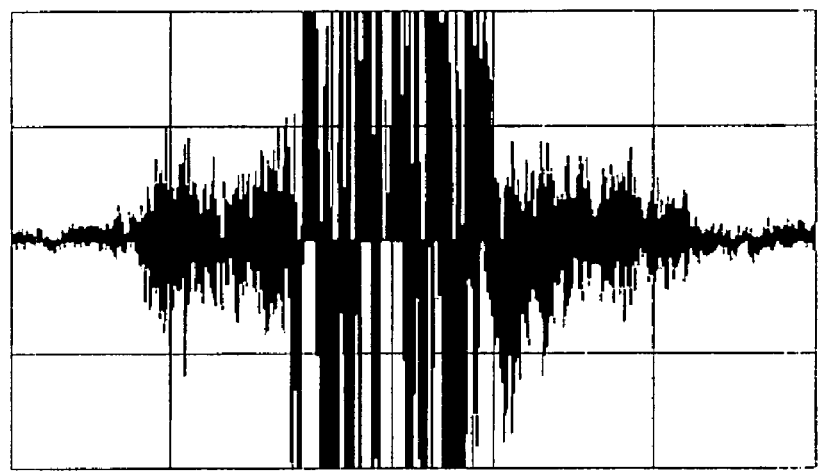
FIG. 3 is a wave diagram of a sound generated by an object moving on the touch plane.

Please refer to FIG. 1 and FIG. 3. FIG. 3 is a wave diagram of a sound generated by an object moving on the touch plane 11. When an object moves up, down, left, or right on the touch plane 11, the sound wave signal shown in FIG. 3 varies tremendously and is unsuitable for being taken as a reference. In order to assist the digital signal processor 132 to determine a moving direction of the object on the touch plane 11, the microphone 12 in this embodiment can be a matrix-type microphone. The matrix-type microphone comprises multiple microphones arranged in matrix arrays, such that the digital signal processor 132 can utilize different sound wave signals from different microphones to determine the moving direction of the object on the touch plane 11. Accordingly, the corresponding direction signal, such as an upward-movement signal, a downward-movement signal, a left-movement signal, and a right-movement signal, is generated to the cell phone.

Figure 4:
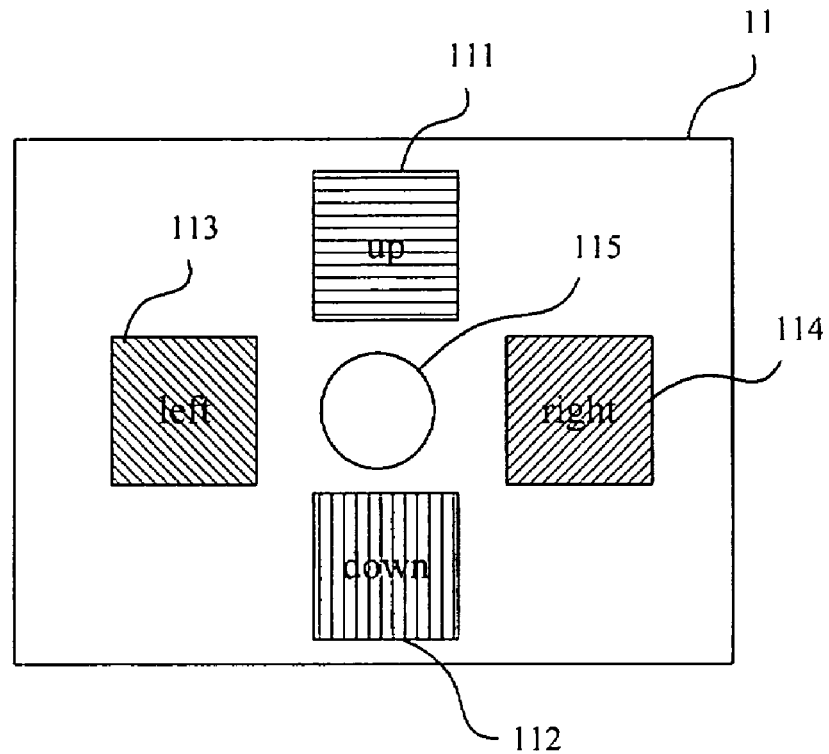
FIG. 4 is a schematic diagram illustrating the touch plane according to another preferred embodiment of the invention.

Please refer to FIG. 1 and FIG. 4. FIG. 4 is a schematic diagram illustrating the touch plane 11 according to another preferred embodiment of the invention. When an object is on a region of the touch plane, a corresponding sound wave can be generated by a specific design of the region. Accordingly, a moving direction of the object can be determined by means of one single microphone 12 (FIG. 1) occupying a smaller region and the touch plane 11. As shown in FIG. 4, the touch plane 11 is divided into four regions comprising an upper-region 111, a lower-region 112, a left-region 113, and a right-region 114. There is a sound-receiving hole 115 centered on the regions 111~114, and the microphone 12 (FIG. 1) is configured beneath the sound-receiving hole 115, so as to raise the sound-receiving efficiency. The sound-receiving hole 115 can be a groove, and the microphone 12 (FIG. 1) can be configured in the sound-receiving hole 115.

Figure 5:
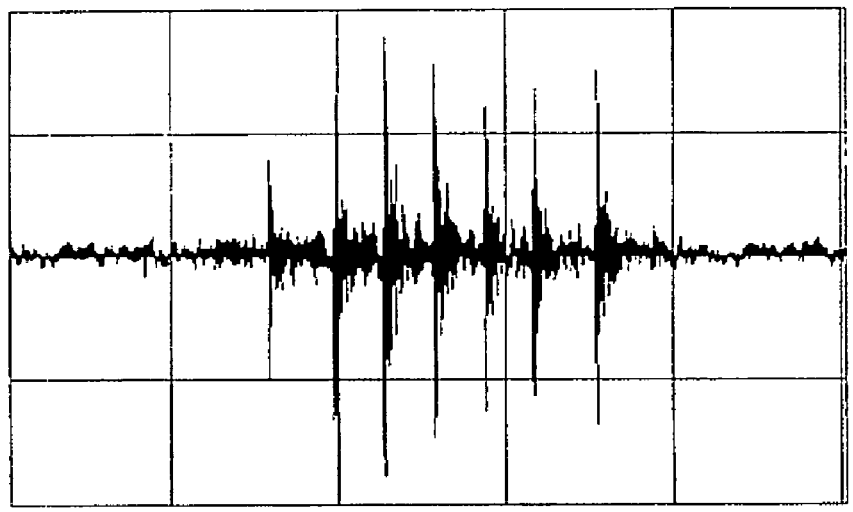
FIG. 5 is a wave diagram of the sound generated by the object moving on the upper-region shown in FIG. 4.
Figure 6:
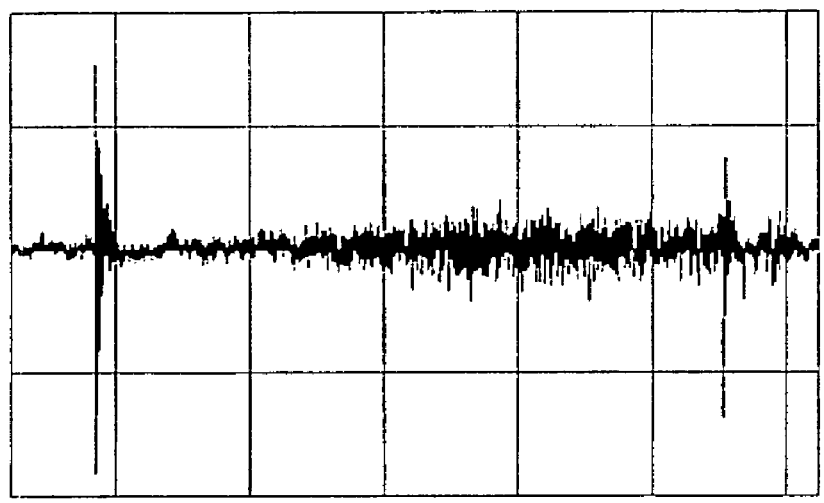
FIG. 6 is a wave diagram of the sound generated by the object moving on the lower-region shown in FIG. 4.
Figure 7:
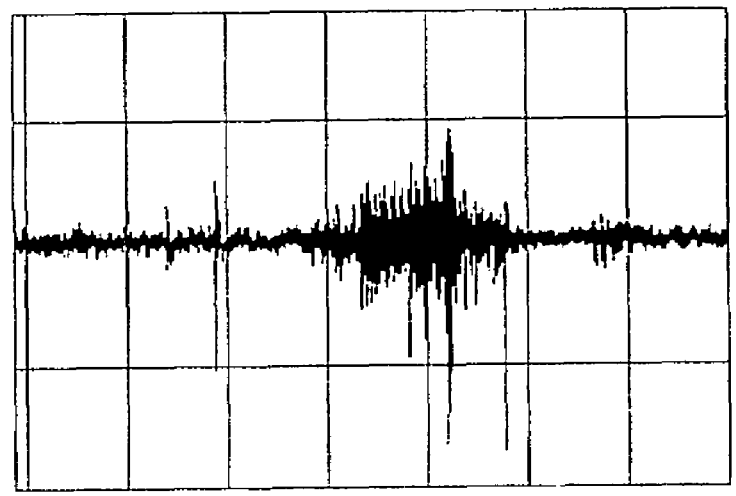
FIG. 7 is a wave diagram of the sound generated by the object moving on the left-region shown in FIG. 4.
Figure 8:
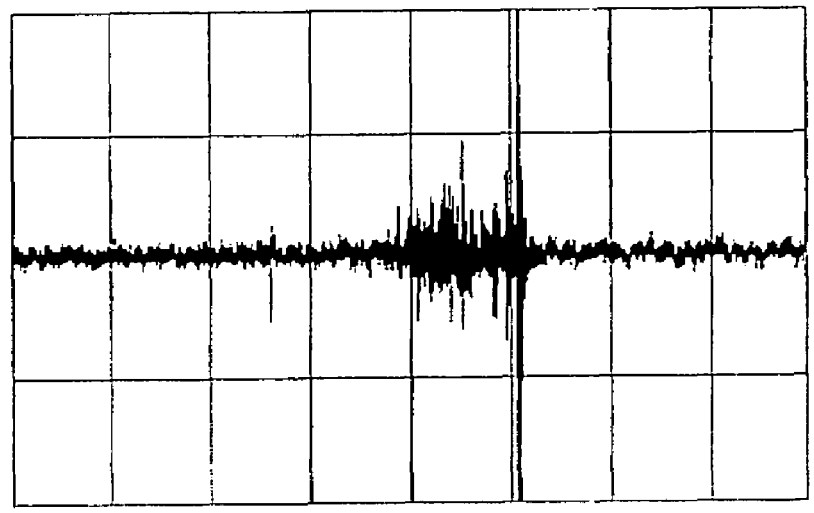
FIG. 8 is a wave diagram of the sound generated by the object moving on the right-region shown in FIG. 4

Furthermore, the object can move on different regions configured with different notches to generate different sounds. Please refer to FIG. 5 through FIG. 8. FIG. 5 is a wave diagram of the sound generated by the object moving on the upper-region 111 shown in FIG. 4. FIG. 6 is a wave diagram of the sound generated by the object moving on the lower-region 112 shown in FIG. 4. FIG. 7 is a wave diagram of the sound generated by the object moving on the left-region 113 shown in FIG. 4. FIG. 8 is a wave diagram of the sound generated by the object moving on the right-region 114 shown in FIG. 4. The upper-region 111 is configured with multiple horizontal notches being parallel to each other. The lower-region 112 is configured with multiple vertical notches being parallel to each other. The left-region 113 is configured with multiple oblique notches extending from the upper-left to lower-right. The right-region 114 is configured with multiple oblique notches extending from upper-right to lower-left. Accordingly, different sounds can be generated by the object moving on different regions and the digital signal processor 132 further pre-stores characteristic data of the digitalized sound wave signal of each region.

In order to determine a moving direction of the object, the digital signal processor 132 analyzes the digitalized sound wave signal received from the AD converter 131. When the sound wave signals are sequentially generated from the upper-region 111 to the lower-region 112, a downward-movement signal is generated. When the sound wave signals are sequentially generated from the lower-region 112 to the upper-region 111, an upward-movement signal is generated. When the sound wave signals are sequentially generated from the left-region 113 to the right-region 114, a right-movement signal is generated. When the sound wave signals are sequentially generated from the right-region 114 to the left-region 113, a left-movement signal is generated. According to the sound wave signal, the digital signal processor 132 can determine the moving speed and the moving duration of the object, so as to calculate the moving distance of the object to append to the moving direction signal.

Therefore, when the user wants to move the cursor down, it only needs to move the object from the upper-region 111 to the lower-region 112, and the digital signal processor 132 will generate the corresponding downward-movement signal to the cell phone. When the user wants to move the cursor up, it only needs to move the object from the lower-region 112 to the upper-region 111, and the digital signal processor 132 will generate the corresponding upward-movement signal to the cell phone. When the user wants to move the cursor left, it only needs to move the object from the right-region 114 to the left-region 113, and the digital signal processor 132 will generate the corresponding left-movement signal to the cell phone. When the user wants to move the cursor right, it only needs to move the object from the left-region 113 to the right-region 114, and the digital signal processor 132 will generate the corresponding right-movement signal to the cell phone. When the cursor has been moved to an option of a window that the user wants to choose, the user only needs to press the object on the sound-receiving hole 115. The digital signal processor 132 will generate a corresponding control signal to the cell phone to execute an instruction corresponding to the option.

Besides, the different sounds can also be generated by the object moving on different regions with different materials instead of the notches with different directions. Additionally, although each direction (up, down, left, or right) of the object is determined according to the movement between two of the four regions 111~114, the number of regions can be adjusted according to practical conditions (e.g. the number of regions can be increased from four to eight). Furthermore, the pointing device in this embodiment can be integrated in a cell phone that has an analog to digital converter (AD converter), so the digital signal processor 132 and the AD converter 131 in this embodiment can be original components of the cell phone. The digital signal processor only needs to pre-store the sound wave signal corresponding to each region 111~114, characteristic data of the object pressing on the touch plane or the microphone, and an analysis procedure of the aforesaid signals and data. Because additional components are not needed, the cost can be lowered.

In short, the pointing device of the invention utilizes the microphone to receive the sound generated by the object moving or acting on the touch plane. The pointing device of the invention can also utilize the matrix-type microphone or regions with different notches or materials to generate the sound wave signal. Accordingly, when the control unit receives the sound wave signal, the control unit generates a direction signal corresponding to the moving direction of the object on the touch plane. Additionally, the cost of the microphone has been currently low, and the volume is small, so the cost and the volume of the pointing device of the invention can be reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A pointing device comprising:
   a touch plane being divided into an upper region, a lower region, a left region and a right region, and an object moving on the regions to correspondingly generate different sounds;
   a microphone for converting the different sounds into different sound wave signals with different waveforms when the object moves on the corresponding regions, and
   a control unit for storing characteristic data corresponding to each region and for analyzing the sound wave signals to determine a moving direction of the object on the touch plane when receiving the sound wave signals according to the different waveforms of the received sound wave signals and the characteristic data, so as to correspondingly generate a direction signal;
   wherein the pointing device has a first frequency, a second frequency, a third frequency, and a fourth frequency, wherein only the first frequency is associated with the upper region, only the second frequency is associated with the lower region, only the third frequency is associated with the left region, and only the fourth frequency is associated with the right region.

2. The pointing device of claim 1, wherein the microphone is a matrix-type microphone.

3. The pointing device of claim 1, wherein the control unit analyzes the sound wave signals sequentially generated from which two of the regions and then determines the moving direction of the object to generate the direction signal.

4. The pointing device of claim 3, wherein when the control unit determines the sound wave signals are sequentially generated from the upper region to the lower region, the control unit generates a downward-movement signal.

5. The pointing device of claim 3, wherein when the control unit determines the sound wave signals are sequentially generated from the lower region to the upper region, the control unit generates an upward-movement signal.

6. The pointing device of claim 3, wherein when the control unit determines the sound wave signals are sequentially generated from the left region to the right region, the control unit generates a right-movement signal.

7. The pointing device of claim 3, wherein when the control unit determines the sound wave signals are sequentially generated from the right region to the left region, the control unit generates a left-movement signal.

8. The pointing device of claim 1, wherein each region of the touch plane has different notch respectively.

9. The pointing device of claim 1, wherein each region of the touch plane is made of a material different from each other.

10. The pointing device of claim 1, wherein the control unit comprises an analog to digital converter (AD converter) for digitalizing the sound wave signals and a digital signal processor for receiving the digital sound wave signals.

11. The pointing device of claim 1, wherein the touch plane further comprises a sound-receiving hole centered on the regions, and the microphone is set underneath the hole.

12. The pointing device of claim 1, wherein the control unit further stores characteristic data corresponding to a press action caused by the object on the touch plane, such that once the sound wave signal conforms with the characteristic data corresponding to the press action, the control unit correspondingly generates a control signal.

* * * * *